United States Patent [19]

Köhler et al.

[11] Patent Number: 5,635,560
[45] Date of Patent: Jun. 3, 1997

[54] MIXTURES OF POLYCARBONATE, PHENOLICALLY HYDROXYFUNCTIONAL BRANCHED DIMERIC FATTY ACID POLYESTERS AND OPTIONALLY GRAFT POLYMER

[75] Inventors: Burkhard Köhler, Krefeld; Dieter Wittmann, Leverkusen; Wolfgang Ebert, Krefeld; Horst Beicher, Tönisvorst; Werner Tischer; Klaus Horn, both of Dormagen, all of Germany

[73] Assignee: Bayer AG, Leverkusen, Germany

[21] Appl. No.: 504,506

[22] Filed: Jul. 20, 1995

[30] Foreign Application Priority Data

Aug. 1, 1994 [DE] Germany ............ 44 27 228.6
Jun. 2, 1995 [DE] Germany ............ 195 20 279.1

[51] Int. Cl.$^6$ ............ C08L 69/00; C08L 67/08; C08L 67/00
[52] U.S. Cl. ............ 525/67; 525/64; 525/133; 525/146; 525/148; 525/439; 524/291
[58] Field of Search ............ 525/67, 133, 146, 525/148, 439; 524/291

[56] References Cited

U.S. PATENT DOCUMENTS 5,045,586  9/1991  O'Lenick ............ 524/291

FOREIGN PATENT DOCUMENTS 0141268  5/1985  European Pat. Off. .
4132079  4/1993  Germany .

OTHER PUBLICATIONS

Orbit Abstract of DE-OS 41 32 079 (Apr. 1, 1993).
Database WPI, Week 9438, Derwent Publications Ltd., London, GB; AN 94-308839 & KR-B-9 310 235 (Kolon Ind Inc), Oct. 15, 1993.
Database WPI, Derwent Publications Ltd., London, GB; AN 93261824 & JP-A-05 179 128 (Kanebo Ltd), Jul. 20, 1993.

Primary Examiner—David Buttner
Attorney, Agent, or Firm—Connolly and Hutz

[57] ABSTRACT

The invention relates to mixtures of polycarbonate, phenolically hydroxyfunctional branched dimeric fatty acid polyesters and optionally graft polymer, which are distinguished by a good low-temperature strength and stress cracking resistance and good mould release properties.

16 Claims, No Drawings

MIXTURES OF POLYCARBONATE, PHENOLICALLY HYDROXYFUNCTIONAL BRANCHED DIMERIC FATTY ACID POLYESTERS AND OPTIONALLY GRAFT POLYMER

The invention relates to mixtures of polycarbonate, phenolically hydroxyfunctional branched dimeric fatty acid polyesters and optionally graft polymers, which are distinguished by high low-temperature strength and stress cracking resistance and good mould release properties.

DE-OS 4 132 079 describes phenolically hydroxyfunctional dimeric fatty acid esters and their use for the production of polyester carbonates. No indication is provided that the dimeric fatty acid polyesters improve the physical properties of mixtures of polycarbonate and optionally graft polymer. The polyester carbonates described in DE-OS 4 132 079 bring about only a slight improvement in impact strength in PC/ABS mixtures.

In injection-moulding processes lubricants and mould release agents are commonly added to prevent the moulded article from adhering to the mould. For this purpose carboxylic acid esters of polyhydric alcohols (e.g. pentaerythritol tetrastearate) are predominantly used in the prior art moulding compounds [Becker/Braun, Kunststoff-Handbuch (Plastics Manual), Vol. 3/2, Technische Polymer-Blends (Industrial Polymer Blends), page 162].

The object of the present invention was to improve the physical properties, and in particular the toughness, stress cracking resistance and impact strength, of polycarbonate and mixtures of polycarbonate and graft polymers, in particular ABS polymers, as well as to improve the mould release properties of the moulding compounds.

It has been found that polycarbonate mixtures containing phenolically hydroxyfunctional dimeric fatty acid polyesters have high toughness and petroleum resistance, and that mixtures of polycarbonate, dimeric fatty acid polyesters and graft polymers have high impact strength and improved mould release properties without any impairment of the remaining properties.

The invention therefore relates to moulding compounds containing

A) 10 to 100, preferably 30 to 96, and in particular 50 to 90 parts by weight of an aromatic polycarbonate and/or aromatic polyester carbonate, B) 0.05 to 25, preferably 0.1 to 15, and most preferably 0.3 to 10 parts by weight of a phenolically hydroxyfunctional branched dimeric fatty acid polyester, C) 0 to 70, preferably 2 to 50, and in particular 5 to 25 parts by weight of a graft copolymer of C.1) 5 to 98 parts by weight of a graft superstrate of one or more monomers on C.2) 2 to 95 parts by weight of one or more elastomeric graft substrates having glass transition temperatures of <10° C., preferably <−20° C., D) 0 to 70, preferably 2 to 50, and in particular 2 to 30 parts by weight of a thermoplastic resin from the group comprising D.1) vinyl (co)polymers and/or D.2) polyalkylene terephthalates, the sum of the parts by weight of A+B+C+D being 100.

Component A

The aromatic polycarbonates and/or aromatic polyester carbonates of component A are known from the literature or can be produced by processes known from the literature (see for example Schnell, "Chemistry and Physics of Polycarbonates", Interscience Publishers, 1964, and DE-AS 1 495 626, DE-OS 2 232 877, DE-OS 2 703 376, DE-OS 2,714 544, DE-OS 3 000 610 and DE-OS 3 832 396 for the production of aromatic polycarbonates; and DE OS 3 007 934 for the production of aromatic polyester carbonates).

Aromatic polycarbonates and/or aromatic polyester carbonates are for example produced by reacting diphenols with carbonyl halides, preferably phosgene and/or with aromatic dicarboxylic acid dihalides, preferably benzene dicarboxylic acid dihalides, by the interfacial process, optionally using chain terminators, such as for example monophenols, and optionally also using tri-functional or higher than tri-functional branching agents, such as for example triphenols or tetraphenols.

Diphenols for the production of the aromatic polycarbonates and/or aromatic polyester carbonates are preferably those of the formula (I)

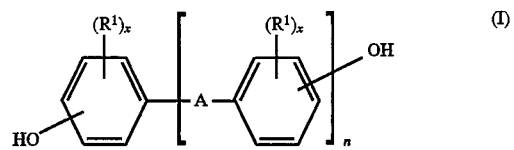

wherein

A denotes a single bond, $C_1$–$C_5$-alkylene, $C_2$–$C_5$-alkylidene, —O—, —SO—,

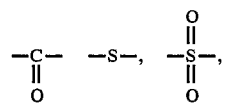

or a radical of the formula (II)

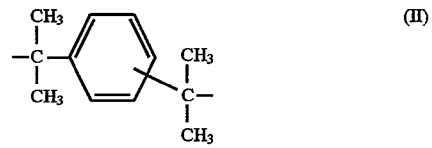

or a radical of the formula (III)

$R^1$ denotes chlorine or bromine, x denotes 0, 1 or 2 and n denotes 1 or 0,

Z denotes carbon, $R^2$ and $R^3$, which can be individually selected for each Z, independently of one another denote hydrogen or $C_1$–$C_6$-alkyl, preferably $C_1$–$C_4$-alkyl, and m denotes an integer from 4 to 7, preferably 4 or 5.

The radical of the formula (III) preferably represents

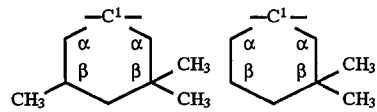

-continued

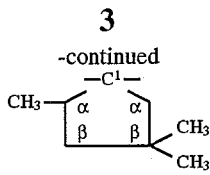

Suitable diphenols are for example hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)-ethers, bis-(hydroxyphenyl)-sulphoxides, bis-(hydroxyphenyl)-ketones, bis-(hydroxyphenyl)-sulphones, and α,α-bis-(hydroxyphenyl)-diisopropylbenzenes and ring-brominated and/or ring-chlorinated derivatives thereof.

Preferred diphenols of the formula (I) are for example hydroquinone, resorcinol, 4,4'-dihydroxydiphenyl, 2,2-bis-(4-hydroxyphenyl)-propane (bisphenol A), 2,4-bis-(4-hydroxyphenyl)-2-methylbutane, 2,2-bis-(4-hydroxy-3,5-dimethylphenyl)-propane, 1,1-bis-(4-hydroxyphenyl)-cyclohexane or 1,1-bis-(4-hydroxyphenyl)-3,3,5-trimethylcyclohexane. Preferred diphenols of the formula (I) are 2,2-bis-(4-hydroxyphenyl)-propane and 1,1-bis-(4-hydroxy-phenyl)-3,3,5-trimethylcyclohexane. Mixtures of diphenols, such as for example bisphenol A and up to 60 mol % of 1,1-bis-(4-hydroxyphenyl)-3,3,5-trimethylcyclohexane can also be used.

Particularly preferred diphenols are bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulphide, 4,4'-dihydroxydiphenyl sulphone and di- and tetrabrominated or chlorinated derivatives thereof, such as for example 2,2-bis(3-chloro-4-hydroxyphenyl)-propane, 2,2-bis( 3,5-dichloro-4-hydroxyphenyl)-propane and 2,2-bis-(3,5-dibromo-4-hydroxyphenyl)-propane. 2,2-Bis-(4-hydroxyphenyl)-propane (bisphenol A) is particularly preferred.

The diphenols can be used individually or in the form of any desired mixtures.

The diphenols are known from the literature or can be obtained by processes known from the literature.

Suitable chain terminators for the production of the thermoplastic, aromatic polycarbonates are for example phenol, p-chlorophenol, p-tert.-butylphenol or 2,4,6-tribromophenol, or long-chain alkyl phenols such as for example 4-(1,3-tetramethylbutyl)-phenol according to DE-OS 2 842 005 or monoakylphenol or dialkylphenols with a total of 8 to 20 C atoms in the alkyl substituents, such as 3,5-di-tert.-butylphenol, p-iso-octylphenol, p-tert.-octylphenol, p-dodecylphenol and 2-(3,5-dimethylheptyl)-phenol and 4,3,5-dimethylheptyl)-phenol. The quantity of chain terminators to be used is generally between 0.5 mol % and 10 mol %, based on the sum of the moles of the diphenols used in each case.

The thermoplastic aromatic polycarbonates have average weight average molecular weights ($\overline{M}_w$, measured for example by ultracentrifugation or scattered light measurement) of 10,000 to 200,000, preferably 20,000 to 80,000.

The thermoplastic aromatic polycarbonates can be branched in known manner, and preferably by the incorporation of 0.05 to 2.0 mol %, based on the sum of the diphenols used, of tri- or higher than tri-functional compounds, for example those having three or more than three phenolic groups.

Both homopolycarbonates and copolycarbonates are suitable. For the production of copolycarbonates A) according to the invention it is also possible to use 1 to 25% by weight, preferably 2.5 to 25% by weight (based on the total quantity of diphenols to be used), of diphenols of the formula (IV)

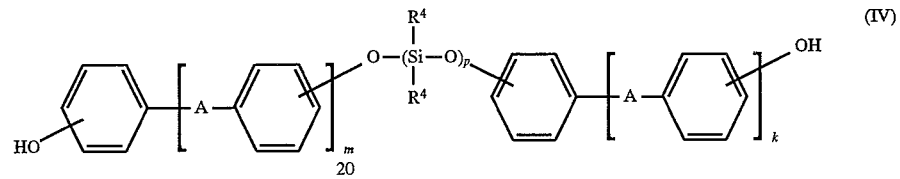

wherein
A has the meaning given under formula (I),
k is 1 or zero,
$R^4$ is identical or different and is a linear $C_1$-$C_{20}$-alkyl, branched $C_3$-$C_{20}$-alkyl or $C_{6-C20}$-aryl radical, preferably $CH_3$, and
p is a number between 5 and 100, and preferably between 20 and 80.

Polydiorganosiloxanes containing hydroxy-aryloxy terminal groups according to formula (IV) are known (see for example U.S. Pat. No. 3,419,634) or can be produced by processes known from the literature. The production of polydiorganosiloxane-containing copolycarbonates is described for example in DE-OS 3 334 782.

In addition to the bisphenol A homopolycarbonates, preferred polycarbonates are the copolycarbonates of bisphenol A with up to 15 mol %, based on the sums of the moles of diphenols, of the other diphenols mentioned as preferred or particularly preferred, and in particular 2,2-bis(3,5-dibromo-4-hydroxyphenyl)-propane.

Aromatic dicarboxylic acid dihalides for the production of the thermoplastic, aromatic polyester carbonates are preferably the diacid dichlorides of iscphthalic acid, terephthalic acid, diphenylether-4,4'-dicarboxylic acid and naphthalene-2,6-dicarboxylic acid.

Mixtures of the diacid dichlorides of isophthalic acid and terephthalic acid in a ratio of between 1:20 and 20:1 are particularly preferred.

In the production of polyester carbonates a carbonyl halide, preferably phosgene is additionally used as a bifunctional acid derivative.

Suitable chain terminators for the production of the aromatic polyester carbonates are, in addition to the monophenols already mentioned, chlorocarbonic acid esters of these monophenols as well as the acid chlorides of aromatic monocarboxylic acids which can optionally be substituted by $C_1$-$C_{22}$-alkyl groups or by halogen atoms, as well as aliphatic $C_2$-$C_{22}$-monocarboxylic acid chlorides.

The quantity of chain terminators is in each case 0.1 to 10 mol %, based, in the case of the phenolic chain terminators, on the number of moles of diphenols and, in the case of monocarboxylic acid chloride chain terminators, on the number of moles of dicarboxylic acid dichlorides.

The aromatic polyester carbonates can also contain incorporated aromatic hydroxycarboxylic acids.

The aromatic polyester carbonates can be either linear or branched in a known manner. (See also DE-OS 2 940 024 and DE-OS 3 007 934 in this regard.)

The branching agents used can for example be tri- or higher than tri-functional carboxylic acid chlorides, such as trimeric acid trichloride, cyanuric acid trichloride, 3,3'- or 4,4'-benzophenone-tetracarboxylic acid tetrachloride, 1,4,5, 8-naphtalenetetracarboxylic acid tetrachloride or pyromellitic acid tetrachloride, in quantities of 0.01 to 1.0 mol % (based on the quantity of dicarboxylic acid dichlorides used) or tri- or higher than tri-functional phenols, such as phloroglucinol, 4,6-dimethyl-2,4,6-tri-(4-hydroxyphenyl)-2-heptene, 4,6-tri-(4-hydroxyphenyl)-2-heptene, 4,6-dimethyl-2,4,6-tri(4-hydroxyphenyl)-heptane, 1,3,5-tri(4-hydroxyphenyl)-benzene, 1,1,1-tri-(4-hydroxyphenyl)-ethane, tri-(4-hydroxyphenyl)-phenylmethane, 2,2-bis[4,4-bis(hydroxyphenyl)-cyclohexyl]-propane, 2,4-bis(4-hydroxyphenylisopropyl)-phenol, tetra-(4-hydroxyphenyl)-methane, 2,6-bis(2-hydroxy-5-methylbenzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in quantities of 0.01 to 1.0 mol % (based on the quantity of diphenols used). Phenolic branching agents can be initially introduced together with the diphenols and acid chloride branching agents can be introduced together with the acid dichlorides.

The quantity of carbonate structural units contained in the thermoplastic aromatic polyester carbonates can be varied as required.

Preferably the quantity of carbonate groups can be up to 100 mol %, in particular up to 80 mol % and most preferably up to 50 mol %, based on the sum of ester groups and carbonate groups.

Both the ester and the carbonate components of the aromatic polyester carbonates can be in the form of blocks or randomly distributed in the polycondensates.

The relative solution viscosity ($\eta_{rel}$) of the aromatic polyester carbonates is in the range from 1.18 to 1.4, preferably 1.22 to 1.3 (measured using solutions of 0.5 g of polyester carbonate in 100 ml $CH_2Cl_2$ solutions at 25° C.).

The thermoplastic aromatic polycarbonates and polyester carbonates can be used alone or in the form of any desired mixtures with one another.

Component B

The dimeric fatty acid polyesters are known and described in DE-OS 4 132 079. The dimeric fatty acid polyesters are branched polyesters containing phenolic OH groups and having average number average molecular weights $\overline{M}_n$ (measured by gel chromatography) of 400 to 200,000, preferably from 2,000 to 100,000 and in particular from 3,000 to 50,000. The polyesters are produced by reacting $C_{36}$ to $C_{44}$ dimeric fatty acids with dialcohols by the known transesterification processes, 0.5 to 10, preferably 1 to 5 mol % of branching agents and 1 to 20, preferably 3 to 20 mol % of hydroxyarylcarboxylic acids or esters thereof with $C_{1-C_6}$-alcohols being used as chain terminators, in each case referred to moles of dimeric fatty acid.

Instead of dicarboxylic acid, anhydrides or alkyl esters thereof can also be used in known manner for the synthesis of the polyesters.

Preferred dicarboxylic acids are $C_{36}$- and $C_{44}$-dimeric fatty acid, which can also contain up to 20% by weight of mono- or tricarboxylic acids or unsaturated acids.

Suitable dialcohols are any desired aliphatic or cycloaliphatic glycols, in which aromatic radicals can also be incorporated, such as (oligo) ethylene glycol, (oligo) propyleneglycol-(1,2) and -(1,3), butylene glycol-(1,4) and -(2,3), hexanediol-(1,6), octanediol-(1,8), neopentylglycol, cyclohexanedimethanol, (1,4-bis-hydroxymethylcyclohexane), 2-methyl-1,3-propanediol, trimethylolpropane monoalkyl ether, polyallyl glycidyl ether or copolymers of allyl glycidyl ether with propylene oxide or ethylene oxide, glycerol monoallyl ether or OH-terminated, bis-functional rubber oligomers, such as for example dihydroxyoligobutadiene and bis-2,3(4-hydroxyethoxyphenyl)-propane. Preferably hexanediol-(1, 6), butylene glycol-(1,4) and neopentylglycol are used.

Suitable branching agents are polyalcohols containing 3 or more alcoholic OH groups, polycarboxylic acids containing 3 or more carboxylic acid substituents, hydroxycarboxylic acids containing aliphatic OH and carboxylic acid functional groups, wherein at least 3 of these functional groups must be present.

Examples of such branching agents are trimethylolpropane, pentaerythritol, trimethylolethane, glycerol, diglycerol, bistrimethylolpropane, bispentaerythritol, 1,2,6-trihydroxyhexane, mannitol, sorbitol, trimesic acid, trimellitic acid, citric acid, tartaric acid, trimeric fatty acid, and preferably trimethylopropane or pentaerythritol.

Suitable phenolic chain terminators are hydroxyarylcarboxylic acids such as for example p-hydroxybenzoic acid, m-hydroxybenzoic acid, salicylic acid, 4-hydroxycinnamic acid, 3-hydroxycinnamic acid or phloretic acid or esters thereof with $C_1-C_6$-alcohols. Preferably m- or p-hydroxybenzoic acids or esters thereof with $C_1-C_6$-alcohols are used.

In addition to the chain terminators to be used according to the invention it is also possible to use aliphatic or aromatic monocarboxylic acids or esters thereof with aliphatic alcohols as chain terminators. Suitable monocarboxylic acids are stearic acid, oleic acid, linoleic acid, linoenic acid, benzoic acid or tert.-butylbenzoic acid.

Suitable catalysts for the production of the polyesters are the known transesterification catalysts such as for example tin compounds or titanium compounds.

The polyesters are produced by mixing the components, the reaction being carried out with or without transesterification catalysts, at temperatures from 150° C. to 250° C., preferably 180° C. to 220° C. and for a reaction time of 2 to 20 hours; during this time low molecular weight substances are distilled off and a vacuum of 0.2 to 100 mbar is preferably applied for 0.5 to 6 hours at the end of the reaction.

Component C

The components C according to the invention are graft copolyers of monomers C.1 on rubber-elastic substrates C.2.

Preferred components C are obtained by the graft copolymerisation of 5 to 98 parts by weight of a graft superstrate C.1 of C.1.1 50 to 99 parts by weight of at least one monomer from the group comprising vinyl aromatics and $C_1-C_4$-alkyl (meth)acrylates and C.1.2 1 to 50 parts by weight of at least one monomer from the group comprising vinyl cyanides, $C_1-C_8$-alkyl (meth)acrylates and ethylenically unsaturated carboxylic acids and derivatives thereof such as anhydrides and imides in the presence of 2 to 95 parts by weight of graft substrate C.2.

Monomers C.1.1 include vinyl aromatics such as for example styrene, α-methylstyrene, ring-substituted styrene such as p-methylstyrene, p-chlorostyrene, as well as methacrylic acid ($C_1-C_4$) esters, such as for example methyl methacrylate, ethyl methacrylate or mixtures of these monomers. Examples of monomers C.1.2 are vinyl cyanides (unsaturated nitriles) such as acrylonitrile and methacrylonitrile, (meth)acrylic acid $(C_1-C_8)$-alkyl esters such as for example methyl methacrylate, n-butyl acrylate, t-butyl acrylate, unsaturated carboxylic acids such as maleic acid and derivatives (such as anhydrides and imides) of unsaturated carboxylic acids, such as for example maleic anhydride and N-phenylmaleimide or mixtures of the aforementioned monomers.

Preferred monomers C.1.1 are styrene, α-methylstyrene and methyl methacrylate, and preferred monomers C.1.2 are acrylonitrile, maleic anhydride and methyl methacrylate.

Particularly preferred monomers are C.1.1 styrene and C1.2 acrylonitrile.

Graft substrates (rubbers) C.2 suitable for the rubber-modified graft copolymers C are for example diene rubbers, EP(D)M rubbers, i.e. those based on ethylene/propylene and optionally diene, acrylate, polyurethane, silicone, chloroprene and ethylene/vinyl acetate rubbers.

Preferred rubbers C.2 are diene rubbers (based for example on butadiene, isoprene etc.) or mixtures of diene rubbers or copolymers of diene rubbers or mixtures thereof with other copolymerisable monomers (e.g. those mentioned for C.1.1 and C.1.2), with the proviso that the glass transition temperature of component C.2 is below 10° C., and preferably below −20° C. Pure polybutadiene rubber is particularly preferred.

Particular preferred graft copolymers C are for example ABS polymers.

Particularly preferred graft copolymers C are described for example in U.S. Pat. No. 3,644,574, in DE-OS 2 248 242 (=GB Patent No. 1,409,275), in U.S. Pat. Nos. 3,243,481, 3,509,237, 3,660,535 and 4,239,863.

The average particle diameter $d_{50}$ of the graft polymer C is generally 0.05 to 5 μm, and preferably 0.1 to 2 μm.

The graft copolymers C are produced by radical polymerisation, such as for example by emulsion, suspension, solution or bulk polymerisation.

Since in the grafting reaction the graft monomers are, as is known, not necessarily completely grafted onto the graft substrate, the graft copolymers C according to the invention also include those products which are obtained by the polymerisation of the graft monomers in the presence of the graft substrate.

Suitable acrylate rubber substrates C.2 for components C are preferably polymers of alkyl acrylates, optionally together with up to 40% by weight, based on C.2 of other polymerisable, ethylenically unsaturated monomers. The preferred polymerisable acrylic acid esters include $C_1-C_8$ alkyl acrylates such as for example methyl, ethyl, butyl, n-octyl and 2-ethylhexyl acrylate; halogenoalkyl acrylates, preferably halogeno-$C_1-C_8$-alkyl acrylates, such as chloroethyl acrylate, and mixtures of these acrylates.

Monomers containing more than one poymerisable double bond can be ccpolymerised to effect crosslinking. Preferred examples of crosslinking monomers are esters of unsaturated monocarboxylic acid containing 3 to 8 C atoms and of unsaturated monohydric alcohols containing 3 to 12 C atoms or saturated polyols containing 2 to 4 OH groups and 2 to 20 C atoms, such as for example ethylene glycol dimethacrylate and allyl methacrylate; polyunsaturated heterocyclic compounds, such as for example trivinyl and triallyl cyanurate; polyfunctional vinyl compounds such as di- and trivinylbenzenes; and also triallyl phosphate and diallyl phthalate.

Preferred crosslinking monomers are allyl methacrylate, ethylene glycol dimethacrylate, dialyl phthalate and heterocyclic compounds containing at least 3 ethylenically unsaturated groups.

Particularly preferred crosslinking monomers are the cyclic monomers triallyl cyanurate, triallyl isocyanurate, trivinyl cyanurate, triacryloyl hexahydro-s-triazine and triallyl benzenes.

The quantity of crosslinked monomers is preferably 0.02 to 5, in particular 0.05 to 2% by weight, based on the graft substrate C.2.

In the case of cyclic crosslinking monomers with at least 3 ethylenically unsaturated groups it is advantageous to limit the quantity to below 1% by weight of the graft substrate C.2.

Preferred "other" polymerisable ethylenically unsaturated monomers which can optionally be used in addition to the acrylic acid esters for the production of the graft substrate C.2 are for example acrylonitrile, styrene, α-methylstyrene, acrylamides, vinyl-$C_1-C_6$-alkyl ethers, methyl methacrylate and butadiene. Preferred acrylate rubbers as the graft substrate C.2 are emulsion polymers.

Further suitable graft substrates according to C.2 are silicone rubbers containing graft-active sites such as those described in DE-OS 3 704 657, DE-OS 3 704 655, DE-OS 3 631 540 and DE-OS 3 631 539.

The average particle size $d_{50}$ is that diameter, above and below which the sizes of in each case 50% by weight of the particles lie. It can be determined by ultracentrifuge measurements (W. Scholtan, H. Lange, Kolloid, Z. und Z. Polymere 250 (1972), 782–796).

Component D

Suitable components D are vinyl (co)polymers D.1 and/or polyatkylene terephthalates D.2.

Components D.1 are (co)polymers of at least one monomer of

D.1.1 50 to 99 parts by weight of vinyl aromatics such as for example styrene, α-methylstyrene, ring-substitued styrene such as p-methylstyrene, p-chlorostyrene, and methylacrylic acid $(C_1-C_4)$-alkyl esters such as for example methyl methacrylate, ethyl methacrylate or mixtures of these monomers, and D.1.2 1 to 50 parts by weight of vinyl cyanides (unsaturated nitriles) such as acrylonitrile and methacrylonitrile, (meth)acrylic acid $(C_1-C_8)$-alkyl esters such as for example methyl methacrylate, n-butyl acrylate, t-butyl acrylate, unsaturated carboxylic acids such as maleic acid and derivatives (such as anhydrides and imides) of unsaturated carboxylic acid, such as for example maleic anhydride and N-phenyl-maleimide or mixtures of these monomers.

The (co)polymers D.1 are resin-like, thermoplastic and free of rubber.

Preferred (co)polymers D.1 include copolymers of

D.1.1 50 to 90, in particular 60 to 90% by weight of styrene, α-methylstyrene, methyl methacrylate or mixtures thereof, and D.1.2 10 to 50, in particular 10 to 40% by weight of (meth)acrylonitrile, methyl methacrylate, maleic anhydride or mixtures thereof, the copolymer of D.1.1 styrene and D.1.2 acrylonitrile being particularly preferred.

The copolymers of component D.1 are frequently obtained as secondary products during the graft copolymerisation of component B, and especially when large quantities of monomers D.1 are grafted onto small quantities of rubber C.2.

The quantity of D.1 to be used according to the invention does not include such secondary products of the graft copolymerisation of C.

The (co)polymers of D.1 are known and can be produced by radical polymerisation, and in particular by emulsion, suspension, solution or bulk polymerisation. The (co) polymers of component C.1 preferably have molecular weights $M_w$ (weight averages, determined by light scattering or sedimentation) of between 15,000 and 200,000.

Polyalkylene terephthalates suitable as component D.2 are reaction products of aromatic dicarboxylic acids (or reactive derivatives thereof, such as for example dimethyl esters or anhydrides) and aliphatic, cycloaliphatic or arylaliphatic diols and mixtures of such reaction products.

Preferred polyalkylene terephthalates can be produced by known methods from terephthalic acids (or reactive derivatives thereof) and aliphatic and cycloaliphatic diols containing 2 to 10 C atoms (Kunststoff-Handbuch, Vol. VIII, page 695 et seq., published by Carl Hanser Verlag, Munich, 1973).

Preferred polyalkylene terephthalates contain 80 to 100, preferably 90 to 100 mol %, based on the dicarboxylic acid component, of terephthalic acid radicals and 80 to 100, preferably 90 to 100%, based on the diol component, of ethylene glycol and/or butadiol-1,4 radicals. In addition to terephthalic acid radicals they contain 0 to 20 mol % of radicals of other aromatic dicarboxylic acids containing 8 to 14 C atoms or of aliphatic dicarboxylic acids containing 4 to 12 C atoms, such as radicals of phthalic acid, isophthalic acid, naphthalene-2,6-dicarboxylic acid, 4,4'-diphenyldicarboxylic acid or succinic, adipic, sebacic, azelaic or cyclohexanediacetic acid. In addition to ethylene glycol and/or butanediol 1,4 radicals they can also contain 0 to 20 mol % of other aliphatic diols containing 3 to 12 C atoms or cycloaliphatic diols containing 6 to 12 C atoms, such as for example radicals of pentanediol-1,5, hexanediol-1,6, cyclohexanedimethanol-1,4, 3-methylpentanediol-1,3 and -1,6, 2-ethylhexanediol-1,3, 2,2-diethylpropanediol-1,3, hexanediol-2,5, 1,4-di(β-hydroxyethylphenyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932). The polyalkylene terephthalates can be branched by incorporating relatively small quantities of 3- or 4-hydric alcohols or 3- or 4-basic carboxylic acids, of the kind described in DE-OS 1 900 270 and U.S. Pat. No. 3,692,744. Examples of preferred branching agents are trimeric acid, trimellitic acid, trimethylolethane and -propane and pentaerythritol. It is recommendable to use no more than 1 mol % of the branching agent, based on the acid component.

Particularly preferred polyalkylene terephthalates are those which have been produced merely from terephthalic acid (or reactive derivatives thereof, such as for example their dialkyl esters) and ethanediol and/or 1,4-butanediol, and mixtures thereof.

Preferred polyalkylene terephthalates also include copolyesters which have been produced from at least two of the abovementioned diols; particularly preferred copolyesters are poly(ethylene glycol/1,4-butanediol) terephthalates. In the copolyesters the various diol radicals can be in the form of blocks or randomly distributed.

The polyalkylene terephthalates of D.2 generally have an intrinsic viscosity of 0.4 to 1.5 dl/g, preferably 0.5 to 1.3 dl/g and in particular 0.6 to 1.2/dl/g, measured in each case in phenol/o-dichlorobenzene (1:1 parts by weight), at 25° C.

The individual components can be used alone or in the form of mixtures.

The moulding compounds according to the invention can also contain additional known additives such as stabilisers (such as for example sterically hindered phosphites and phenols), the commonly used pigments, mould release agents (such as for exmaple pentaerythritol tetrastearate), flow auxiliaries, filling and reinforcing materials (such as for example glass fibres and carbon fibres), flame retardants (such as for example organic phosphates such as triphenyl phosphate/resorcinol diphosphate and antidripping agents such as tetrafluoroethylene polymers) and antistatic agents (such as for example based on potyalkylene ethers, or alkali metal salts of alkanesulfonic acids) in the usual quantities.

The moulding compounds according to the invention can be produced by mixing the components in a known manner and melt-compounding or melt-extruding the mixtures at elevated temperatures, preferably at 200° to 350° C., in commonly used apparatuses such as internal kneaders, extruders or twin-screw extruders.

The moulding compounds according to the invention can be used for the production of all kinds of moulded articles, such as for example by injection-moulding or extrusion blowing. Examples of moulded articles are: housing parts (e.g. for household appliances such as juice extractors, coffee machines and mixers), covering panels for the building industry and in particular automobile parts. They are also used for electrical appliances, such as for example for multipoint connectors, since they have very good electrical properties.

Moulded articles can also be produced from previously produced sheets or films by deep-drawing.

The invention thus also relates to the use of the above-described moulding compounds for the production of moulded articles.

EXAMPLES

Components:

A bisphenol A polycarbonate with a relative solution viscosity of 1.28 (measured using a 0.5% solution in methylene chloride at 25° C.) is used as polycarbonate a).

A bisphenol A polycarbonate with a relative solution viscosity of 1.26 (measured using a 0.5% solution in methylene chloride at 25° C.) is used as polycarbonate b).

A bisphenol A polycarbonate with a relative solution viscosity of 1.29 (measured in methylene chloride at 25° C. and in a concentration of 0.5 g/100 ml) is used as polycarbonate c).

A phenolically hydroxyfunctional, branched dimeric fatty acid polyester according to Example A1 of DE-OS 4 132 079 is used as the dimeric fatty acid polyester (dim polyester):

288.5 g (0.5 mol) of $C_{36}$-dimeric fatty acid, 50 g (0.5 mol) of Adipol (1,6-hexanediol), 6.9 g (0.05 mol) of 4-hydroxybenzoic acid, 2.7 g (0.02 mol) of trimethylolpropane, 0.2 g of hydroquinone and 0.2 g of dibutyltin oxide are mixed. The mixture is heated to 180° C. for 2 hours and to 220° C. for 4 hours and 303.57 g of the dimeric fatty acid polyester with a content of 0.35% of phenolic OH, an OH value (aliphatic OH) of 16 and an acid number of 4 is obtained.

A graft polymer of 45 parts by weight of styrene and acrylonitrile in a weight ratio of 72:28 on 55 parts by weight of a particulate crosslinked polybutadiene rubber (average particle diameter $d_{50}=0.4$ µm), produced by emulsion polymerisation, is used as the ABS polymer.

A styrene/acrylonitrile copolymer with a styrene:acrylonitrile weight ratio of 72:28 and an intrinsic viscosity of 0.55 dl/g (measured in dimethylformamide at 20° C.) is used as the SAN.

Test conditions

The stress cracking properties were examined using rods measuring 80×10 ×4 mm. The test medium used was a mixture of 50% by volume of toluene and 50% by volume of isooctane. The test specimens were prestretched (to an extent of 0.6%) by means of a circular arc template and stored in the test medium at room temperature. The stress cracking properties were assessed by the crack formation or fracture as a function of the exposure time in the test medium.

The notched impact strength was determined in accordance with ASTM D 256.

Example 1

1,800 g of polycarbonate a) and 200 g of dim polyester were dissolved in a mixture of 4 l of chlorobenzene and 8 l of methylene chloride and the solution was evaporated in an evaporation extruder (ZSK 32 with a vacuum dome) at 280° C.

A material is obtained whose tough/brittle transition point in the notched impact test is −40° C. and which does not display any cracks after being stressed to an extent of 0.6% outer fibre strain and being exposed for 2 minutes to a mixture of 1:1 isooctane/toluene.

Comparison Example 1a

A polyester carbonate containing 10% by weight of a dim polyester 22.6 g of bisphenol A, 2.54 g of a dim polyester and 3 mol % of tert.-butylphenol as the chain terminator are initially introduced together with 400 ml of distilled water, 24 g of NaOH and 400 ml of dichloromethane. Then 20 g of phosgene are introduced with stirring and 0.14 g of N-ethylpiperidine are added. The mixture is stirred for 1 hour at room temperature and acidified with dilute hydrochloric acid. After separating off the organic phase and washing until neutral the mixture is evaporated.

The product has a relative solution viscosity $\eta_{rel}=1.31$ (measured using a 0.5% solution in methylene chloride at 20° C.).

A material is obtained which undergoes ductile fracture at −20° C. in the notched impact test.

Example 2

40% by weight of polycarbonate b)
21.6% by weight of polycarbonate a)
2.4% by weight of a dim polyester
20% by weight of an ABS graft polymer and
16% by weight of SAN
are mixed together. The notched impact strength is 61 kJ/m² at an injection temperature of 260° C. and 55 kJ/m² at an injection temperature of 280° C. (i.e. 10% less than at 260° C.).

Comparison Example 2a

40% by weight of polycarbonate b)
24% by weight of the polyester carbonate according to Comparison Example 1a
20% by weight of an ABS graft polymer and
16% by weight of SAN
are mixed together. The notched impact strength is 56 kJ/m² at an injection temperature of 260° C. and 49 kJ/m² at an injection temperature of 280° C. (i.e. 12.5% less than at 260° C.).

Comparison Example 2b

24% by weight of an ABS graft polymer, 16% by weight of SAN and 60% by weight of polycarbonate b) are mixed together. The notched impact strength is 52 kJ/m² at an injection temperature of 260° C. and 44 kJ/m² at an injection temperature of 280° C. (i.e. 15% less than at 260° C.).

Test B

The comparison example contains pentaerythritol tetrastearate (PETS) instead of the DIM polyester The individual components are melted and homogenised in a 3.5 l internal kneader at temperatures between 210 ° and 250° C.

Test conditions:

In order to determine the static and sliding friction coefficients plate-shaped mouldings (with a diameter of 10 cm) are produced in an injection-moulding machine with a special mould at a melt temperature of 260° C. and a mould temperature of 80° C.

The static friction is proportional to the measured torque which is necessary to enable the moulding to break away from the steel surface of the mould by means of a rotating motion.

The sliding friction is proportional to the measured torque which has to be applied for the moulding to slide (continuation of the rotating motion) along the steel surface of the mould.

The following equations apply to the static and sliding friction forces $F_{fr/st}$ and $F_{fr/sl}$:

$$F_{fr/st}=\mu_{st} \times F_n$$

$$F_{fr/sl}=\mu_{sl} \times F_n$$

$F_n$: the normal force acting on the moulding
$\mu_{st}$: coefficient of friction (static friction)
$\mu_{sl}$: coefficient of friction (sliding friction)

The relationship between the frictional forces and the measured torque ($M_t$) is as follows:

$$M_t=F_{fr} \times l$$

l:distance covered

Thus low coefficients of static friction indicate that a moulding compound has advantageous mould release properties.

Rods measuring 80×10×4 mm³ (processing temperature 260° C.) are produced from the moulding compounds in an injection-moulding machine and used for measuring the notched impact strength at room temperature (in accordance with the method of ISO 180 1A) and the heat resistance in accordance with Vicat VST B 120 (DIN 53 460).

The following table shows the composition and technological properties of moulding compounds according to the invention.

As shown in the table, the addition of component B according to the invention in a comparable or smaller quantity than PETS (a prior art mould release agent) produces an improvement in the mould release properties; the toughness and heat resistance are not impaired (Comparison Example 3, Examples 4 to 6 according to the invention).

Compositions and properties of the moulding compounds

| | Components [parts by weight] | | | | | Notched impact strength ISO 180 1A [kJ/m$^2$] | Vicat VST B 120 DIN 53 460 [°C.] | Coefficients of friction | |
|---|---|---|---|---|---|---|---|---|---|
| Example | PC c) | ABS b) | SAN | DIM polyester | PETS | | | static | sliding |
| 3 (comparison) | 57.7 | 20.8 | 20.8 | — | 0.7 | 49 | 119 | 0.28 | 0.13 |
| 4 | 57.7 | 20.9 | 20.9 | 0.5 | — | 50 | 120 | 0.21 | 0.09 |
| 5 | 57.7 | 20.8 | 20.8 | 0.7 | — | 50 | 120 | 0.21 | 0.07 |
| 6 | 57.4 | 20.8 | 20.8 | 1 | — | 50 | 120 | 0.21 | 0.06 |

We claim:

1. Thermoplastic moulding compounds containing mixtures of:
  A) 10 to 100 parts by weight of an aromatic polycarbonate and/or aromatic polyester carbonate,
  B) 0.05 to 25 parts by weight of phenolically hydroxyfunctional branched dimeric fatty acid polyesters,
  C) 0 to 70 parts by weight of a graft copolymer of
    C.1 5 to 98 parts by weight of a graft superstrate of one or more monomers on
    C.2 2 to 95 parts by weight of one or more elastomeric graft substrates having glass transition temperatures of <10° C.,
  D) 0 to 70 parts by weight of a thermoplastic resin from the group comprising
    D.1 vinyl (co)polymers and/or
    D.2 polyalkylene terephthalates,
    the sum of the parts by weight of A+B+C+D being 100.

2. Thermoplastic moulding compounds according to claim 1, characterised in that they contain 0.1 to 15 parts by weight of component B.

3. Thermoplastic moulding compounds according to claim 1, characterised in that they contain 0.3 to 10 parts by weight of component B.

4. Thermoplastic moulding compounds according to claim 1, characterised in that component C.1 is composed of
  C.1.1 50 to 99 parts by weight of at least one monomer selected from the group consisting of vinyl aromatics and $C_1$–$C_4$ alkyl(meth)acrylates and
  C.1.2 1 to 50 parts by weight of at least one monomer selected from the group consisting of vinyl cyanides, ethylenically unsaturated carboxylic acids and derivatives of said carboxylic acids.

5. Thermoplastic moulding compounds according to claim 4, wherein said derivatives of said ethylenically unsaturated carboxylic acids are anhydrides or imides.

6. Thermoplastic moulding compounds according to claim 1, characterised in that component D.1 is composed of
  D.1.1 50 to 99 parts by weight of at least one monomer selected from the group consisting of vinyl aromatics and $C_1$–$C_4$ alkyl(meth)acrylates and
  D.1.2 1 to 50 parts by weight of at least one monomer selected from the group consisting of vinyl cyanides, ethylenically unsaturated carboxylic acids and derivatives of said carboxylic acids.

7. Thermoplastic moulding compounds according to claim 6, wherein said derivatives of said ethylenically unsaturated carboxylic acids are anhydrides or imides.

8. Thermoplastic moulding compounds according to claim 1, characterised in that component D.2 is polybutylene terephthalate or polyethylene terephthalate or a mixture thereof.

9. Thermoplastic moulding compounds according to claim 1, characterised in that they contain at least one additive selected from the group consisting of stabilisers, pigments, mould release agents, flow auxiliaries, fillers and reinforcing materials, flame retardants and antistatic agents.

10. Moulded articles produced from thermoplastic moulding compounds according to claim 1.

11. Thermoplastic moulding compounds according to claim 1, characterised in that component C.1 is composed of
  C.1.1 50 to 99 parts by weight of vinyl aromatics; and
  C.1.2 1 to 50 parts by weight of at least one monomer selected from the group consisting of vinyl cyanides, ($C_1$–$C_8$)-alkyl (meth)acrylates, ethylenically unsaturated carboxylic acids and derivatives of said carboxylic acids.

12. Thermoplastic moulding compounds according to claim 1, characterised in that component D.1 is composed of
  D.1.1 50 to 99 parts by weight of vinyl aromatics; and
  D.1.2 1 to 50 parts by weight of at least one monomer selected from the group consisting of vinyl cyanides, ($C_1$–$C_8$)-alkyl (meth)acrylates, ethylenically unsaturated carboxylic acids and derivatives of said carboxylic acids.

13. Thermoplastic moulding compounds according to claim 1, characterised in that component C.1 is composed of 100 parts by weight of at least one $C_1$–$C_4$ alkyl(meth)acrylate monomer.

14. Thermoplastic moulding compounds according to claim 1, characterised in that component D.1 is composed of 100 parts by weight of at least one $C_1$–$C_4$ alkyl(meth)acrylate monomer.

15. Thermoplastic moulding compounds containing mixtures of:
  A) 30 to 96 parts by weight of an aromatic polycarbonate and/or aromatic polyester carbonate,
  B) 0.05 to 25 parts by weight of phenolically hydroxyfunctional branched dimeric fatty acid polyesters,
  C) 2 to 50 parts by weight of a graft copolymer of
    C.1 5 to 98 parts by weight of a graft superstrate of one or more monomers on
    C.2 2 to 95 parts by weight of one or more elastomeric graft substrates having glass transition temperatures of <10° C.,
  D) 2 to 50 parts by weight of a thermoplastic resin from the group comprising
    D.1 vinyl (co)polymers and/or
    D.2 polyalkylene terephthalates, the sum of the parts by weight of A+B+C+D being 100.

16. Thermoplastic moulding compounds according to claim 15, characterised in that they contain 0.1 to 15 parts by weight of component B.

* * * * *